United States Patent [19]

Weichhand

[11] 4,178,120
[45] Dec. 11, 1979

[54] APPARATUS FOR TRANSFERRING ELONGATED ARTICLES FROM A SINGLE FILE SUPPLY INTO PRODUCT BUCKETS OF A CARTONER

[75] Inventor: Robert J. Weichhand, Ft. Mitchell, Ky.

[73] Assignee: R. A. Jones & Co. Inc., Covington, Ky.

[21] Appl. No.: 829,589

[22] Filed: Sep. 1, 1977

[51] Int. Cl.² ............................................. B65G 57/08
[52] U.S. Cl. ........................................ 414/41; 53/240; 53/244; 198/419; 198/424
[58] Field of Search ............... 214/6 M, 152; 198/436, 198/457, 482, 424, 420, 469, 517; 53/160, 240, 244, 250

[56] References Cited

U.S. PATENT DOCUMENTS

| 1,639,512 | 8/1927 | Lange | 198/436 |
|---|---|---|---|
| 3,141,274 | 7/1964 | Nigrelli et al. | 53/160 |
| 3,290,859 | 12/1966 | Talbot | 53/160 |
| 3,377,774 | 4/1968 | Nigrelli et al. | 53/160 |
| 3,552,089 | 1/1971 | Bushnell | 198/436 |

FOREIGN PATENT DOCUMENTS 908619 8/1972 Canada ..................................... 53/160

Primary Examiner—Stephen G. Kunin
Assistant Examiner—Ross Weaver
Attorney, Agent, or Firm—Wood, Herron & Evans

[57] ABSTRACT

Apparatus for transferring elongated articles into the product buckets of a cartoner. The articles are conveyed single file and are diverted by a primary diverter into two diverter conveyors. The articles are thereafter pushed from the diverter conveyors into left and right accumulator stations onto conveyors moving transversely in opposite directions. The accumulator conveyors hold the articles side-by-side at the downstream end of the accumulator conveyors. A pusher bar pushes a group of articles from their ends longitudinally off the accumulator conveyor onto a dead plate which overlies the cartoner product bucket conveyor. A sweep bar sweeps the articles off the dead plate into the product buckets. The dead plate has a finger which projects alongside of the dead plate over which the ends of the articles ride so as to cause the articles to drop into the product buckets one end at a time, thereby providing better control over the position and orientation of the articles in the product buckets.

12 Claims, 12 Drawing Figures

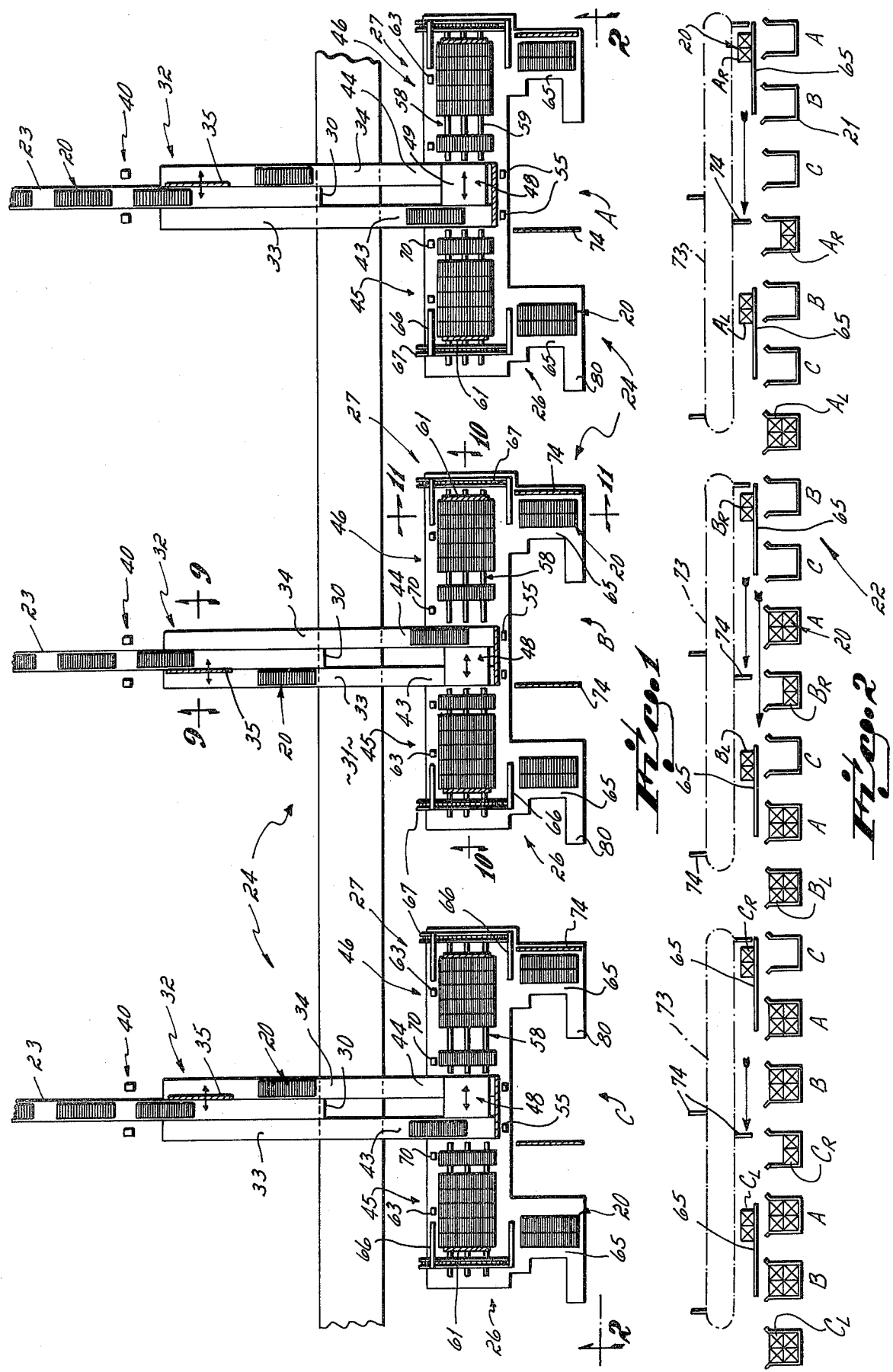

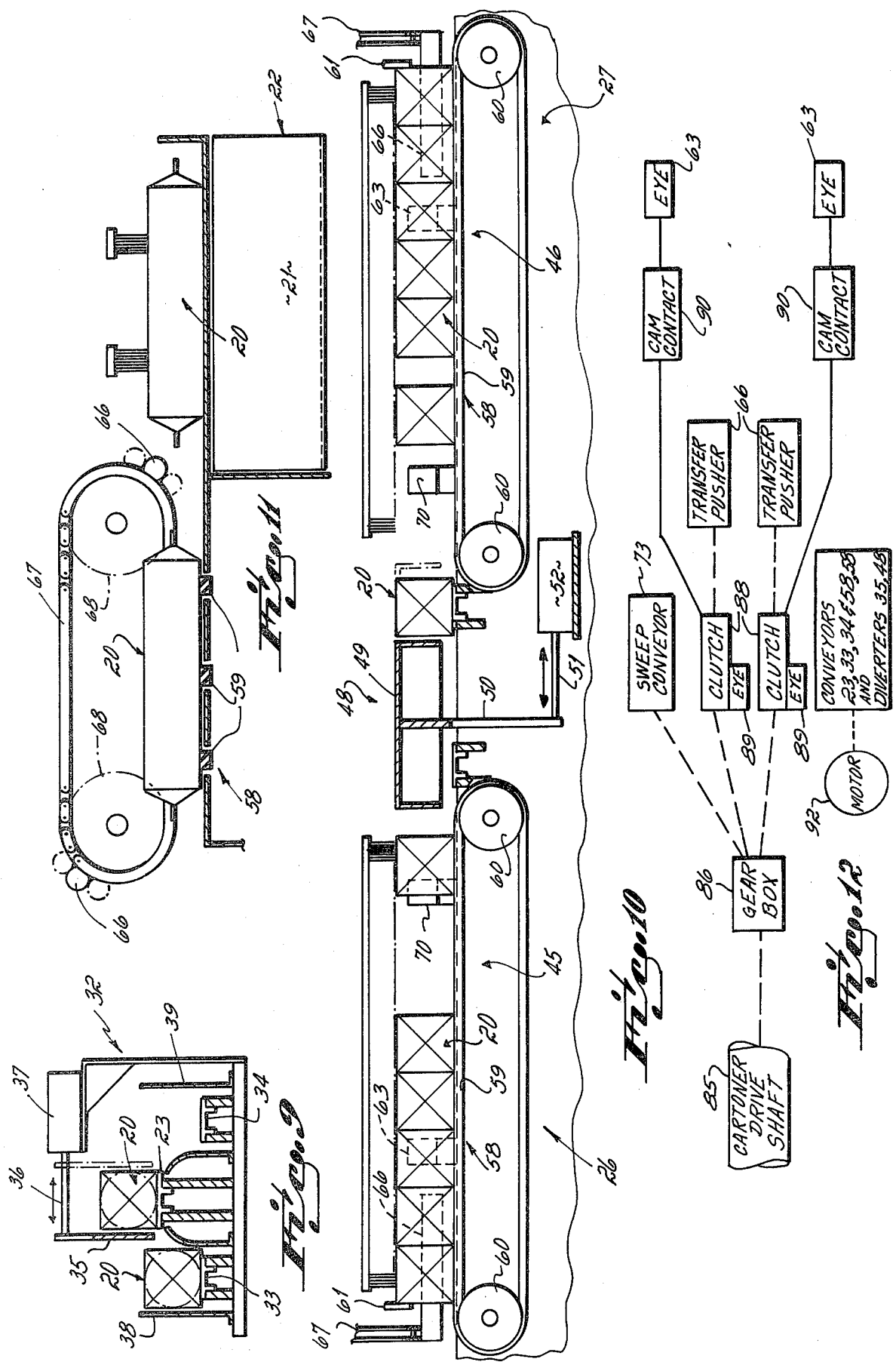

APPARATUS FOR TRANSFERRING ELONGATED ARTICLES FROM A SINGLE FILE SUPPLY INTO PRODUCT BUCKETS OF A CARTONER

This invention relates to apparatus for transferring elongated articles such as cracker packages into product buckets of a cartoner. While the invention has application to the transfer of elongated articles other than crackers, it is particularly useful in that environment and it will be described in relation to the cartoning of crackers.

It has been customary to package crackers whether square, round or oval shaped in an elongated, generally tubular package, the package usually having finned ends where the tube is sealed. Such packages have been fed single file from a wrapping machine on a conveyor. The packages have been fed onto a lane divider so as to form two or more lanes of crackers, the number of lanes being dependent upon the number of packages to be deposited in a layer in the product buckets of the cartoner. These multiple rows have been fed, with the packages in end-to-end abutting relation, into a transfer mechanism. A check and release device has clamped a leading group of packages and at an appropriate time releases that group to be thrust by the conveyor for the group onto a dead plate overlying the product buckets. To assure precise positioning, the packages have been thrust against a vertical plate. The next group of packages has been clamped by the check and release mechanism and the vertical plate moved out of the way. An overhead paddle then has swept the packages off the dead plate into the product buckets passing below the dead plate.

Where multiple layers of packages are stacked in the product buckets, the product buckets must be deep. To assure proper orientation of the packages in the product buckets, a ramp has been provided down which the packages slide, the ramp assisting in maintaining proper orientation of the packages during the transfer.

There are several disadvantages to the existing apparatus for packaging cracker packages as described above. A major disadvantage resides in the need to convey the packages in the transfer apparatus in end-to-end abutting relation with a substantial number of packages, forming the prime, being continuously driven in abutting relation at the transfer apparatus by a continuously-moving conveyor underneath them. The crackers themselves are quite fragile over their surface areas and the pressure on the surface areas as well as the impact from incoming packages causes a crushing of the cracker surfaces.

Further, the finned packages have a tendency to ride up on one another and therefore do not feed smoothly into the transfer mechanism.

Further, the ramp which is used to deposit layers of cracker packages into deep product buckets is not entirely satisfactory in maintaining a proper orientation of the packages in the buckets. Further, the ramp requires a rather precise timing of the mechanism, for the ramp used to guide packages into the bottom layer of one product bucket will be swung upwardly by the movement underneath it by another product bucket containing a layer of crackers. The ramp thus raised must be dropped into the next product bucket in order to be in position for the transfer of the next layer of packages. The resulting up and down movement of the ramp with respect to the product buckets gives rise to problems in transferring the packages down the ramp into the product buckets particularly at high speeds of operation. Further, at high speeds the rapid swinging up and down of the ramp causes a strain on the mechanism.

Another disadvantage of the apparatus is the cost of the mechanisms associated with the apparatus, particularly including the lane divider or channelizer which is necessary to divide the single file packages into plural rows. Further, known channelizers do not handle cylindrical packages well.

An objective of the present invention has been to provide apparatus for transferring elongated packages into product buckets which eliminates the disadvantages of the present machinery used for that purpose.

More particularly, an objective of the invention has been to eliminate the end-to-end prime of packages awaiting transfer into the product buckets, thereby minimizing damage to the product as well as the difficulties arising out of the packages tending to ride upon one another.

Another objective of the invention has been to eliminate the ramp presently used for the transfer of the packages into product buckets and to provide a configurated dead plate which effects a better control over the packages as they are swept off the dead plate into the product buckets.

Another objective of the invention has been to provide a primary diverter which divides the single file packages into two lanes and also provides means for diverting incoming packages from the transfer apparatus in the event that there is a jam at the transfer apparatus.

Another feature of the invention is to effect substantial reduction in the cost of the apparatus.

The several objectives of the invention are attained by transfer mechanism which is generally described as follows:

A diverter is placed at the downstream end of a single file conveyor carrying packages from the wrapping machine. The diverter has two conveyors which are transversely spaced at either side of the single file conveyor. A reciprocating pusher shifts alternating packages to the left and right from the single file conveyor onto the two diverter conveyors. If a jam is detected downstream or an over supply in the prime, the diverter becomes inoperative and the packages on the single file conveyor pass between the two diverter conveyors and drop onto another conveyor for hand packing.

The diverter conveyors discharge into an accumulator section. There a pusher sweeps the packages transversely left and right onto accumulator conveyors running in opposite directions where the packages are carried transversely against a stop plate until a sufficient number in the thus formed prime have accumulated for further transfer into the product buckets. The accumulator conveyor continuously urges the packages against the stop plate, but since the packages are oriented side-by-side as contrasted to end-to-end, there is no damage to the product, nor is there any tendency of the packages to ride upon one another. The group of packages necessary to form a layer in each product bucket (two or three, for example) is swept off the accumulator conveyor onto a dead plate which overlies the product buckets. Paddles on an overhead endless chain then sweep the packages off the dead plate into the product buckets.

The dead plate has a finger which extends in the direction of the movement of the carton or product buckets and is positioned to underlie one end of each package. Therefore, as the packages are swept off the dead plate, one end of the package drops freely into the product bucket while the other end rests upon the finger until the package is completely swept off the dead plate. Since each package drops, one end at a time, into the product bucket, the package is maintained under control by the end of the package resting on the finger end and by the first dropped end of the package resting on the bottom of the product bucket. The packages are thus dropped gently but under control into the product buckets where the desired orientation is maintained for further transfer into cartons at the downstream end of the product buckets conveyor by a conventional cartoner.

The several objectives and features of the invention will become more readily apparent from the following detailed description taken in conjunction with the accompanying drawings in which:

FIG. 1 is a diagrammatic plan view of three transfer apparatuses feeding a single cartoner;

FIG. 2 is an end elevational view of the apparatus of FIG. 1 taken in the direction of lines 2—2 of FIG. 1;

FIG. 9 is a cross-sectional view taken along lines 9—9 of FIG. 1 illustrating the primary diverter;

FIG. 10 is a cross-sectional view taken along lines 10—10 of FIG. 1 illustrating the accumulator section;

FIG. 11 is a cross-sectional view taken along lines 11—11 of FIG. 1 illustrating the mechanism for transferring the packages from the accumulator section to the dead plate overlying the product buckets;

FIG. 12 is a diagrammatic view illustrating the drive and control mechanism for the apparatus.

Figure 3:
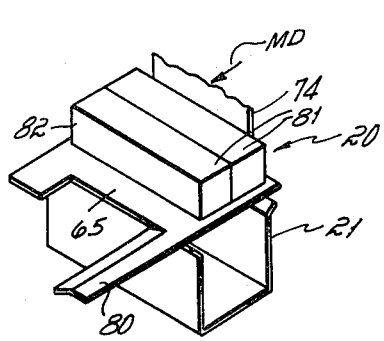
FIGS. 3-8 are diagrammatic views illustrating the sequence of steps in the transfer of the packages from the dead plate into the product buckets.

The general organization of the apparatus of the present invention is illustrated in FIGS. 1 and 2. The illustrated apparatus is set up to place four packages 20, two packages to a layer or tier, into each product bucket 21 on a product bucket conveyor 22 which is driven by a cartoner (not shown). The packages are fed from three wrapping machines which have downstream conveyors 23 feeding packages 20 single file into three transfer apparatuses 24 of the present invention. Each apparatus has left and right transfer positions 26 and 27. It is desired that each product bucket is filled with product from a single wrapping machine, and therefore the lower layer in each product bucket will be filled from the upstream or right-hand transfer location 27 and the upper layer will be filled from the downstream or left-hand transfer location 26 by utilizing a single transfer mechanism being fed from a single wrapping machine to fill a single product bucket. There will be identity of product in each carton and, further, in the event that one of the wrapping machines is down for any reason, the cartoning apparatus can still function by cartoning the packages in two out of three product buckets.

As best shown in FIG. 2, each transfer apparatus fills every third product bucket.

The conveyor 23 from the wrapping machine has a downsteam end 30. An ejector conveyor 31 underlies the downstream end 30 to convey packages away from the apparatus for hand packaging in the event of a jam on the machines or too large a prime, as will be described below.

Alongside the downstream end 30 of the conveyor 23 is a primary diverter 32 which cooperates with left and right diverter conveyors 33 and 34, respectively. The diverter 32 includes a diverter plate 35 which overlies the junction of the single file conveyor 23 and the diverter conveyors 33, 34 to shift alternate packages from the single file conveyor to the left and right conveyors, respectively.

As shown in FIG. 9, the diverter plate 35 is mounted on a piston rod 36 of a double-acting piston and cylinder 37. Alternatively the plate could be driven through a clutch acting through crank. Guide plates 38 and 39 are positioned alongside the diverter conveyors 33, 34, respectively, to stop the transversely pushed package 20 and align it with its conveyor 33 or 34. The diverter conveyors 33, 34 are spaced slightly downwardly from the single file conveyor 23 to facilitate the shifting of the packages from the conveyor 23 to the respective conveyors 33, 34.

A photoelectric device 40 is located upstream of the diverter conveyors to provide a beam of light across the single file conveyor. The photoelectric device 40 detects the presence of an incoming package and causes the operation of the piston and cylinder 37 to shift the plate 35 from one position to the other during which the plate shifts an incoming package from the conveyor 23 to a respective conveyor 33 or 34.

The conveyors 33, 34 have downstream ends 43, 44 which feed into left and right accumulator sections 45, 46 respectively. A secondary diverter 48 is located at the downstream ends 43, 44 to shift packages in left and right directions transversely off the conveyors 33, 34 and into the accumulator sections. The secondary diverter 48 is shown in FIG. 10 and includes a pusher 49 having a depending arm 50 connected to a piston rod 51 of a double-acting piston and cylinder 52. Pusher 49 can also be driven by a clutch and crank driven by a separate motor. Sensors 55 at the downstream ends of the conveyors 33, 34 detect the arrival of a package on each conveyor. When a package arrives, the piston and cylinder 52 is energized to cause the pusher to shift in a direction to move the package off the conveyor onto its respective accumulator section. The pusher stops at that point. When the alternate sensor then detects the arrival of a package on the alternate conveyor, the operation of the pusher is reversed.

Each accumulator section has a conveyor 58 consisting of three conveyor belts 59 passing around pulleys 60 (FIG. 10). The conveyors operate continuously and carry the packages away from the diverter conveyors to a position against stop plates 61, thereby creating the prime of a plurality of packages 20 in side-by-side relation.

A sensor 63 in each accumulator section determines that there are a sufficient number of packages in the prime to fill a layer in the product buckets. The packages are thus ready to be shifted longitudinally out of the accumulator sections and onto a dead plate 65 in each transfer location 26, 27 in a position for transfer into the product buckets. The transfer onto the dead plates is effected by cross transfer pushers 66 (FIG. 11) which are mounted on endless chains 67 passing over sprockets 68. The operation of the chains is cam-controlled to clutch one of the sprockets 68 to the cartoner for a sufficient length of time to cause a pusher bar 66 to engage the ends of two packages and thrust them onto the dead plate 65. The actuation of the clutch to driver the pusher bars requires two conditions to be met. First, the sensor 63 must detect the presence of a sufficient number of packages in the prime and, second, a cartoner-driven cam contact in an electrical control system must be in a proper position so that the thrust of the packages onto the dead plate is timed to the position of the paddles on an overhead sweep overlying the dead plate to be described below.

Another photoelectric device, not shown, acting on the drive to the sprockets 68, is operative to effect disengagement of the clutch after one revolution when the pusher bar 60 has driven a package onto the dead plate 65.

The accumulator sections have another sensor 70 at the upstream end of each conveyor 58 to detect the presence of too many packages in the prime. It is provided with a time delay so as not to be operated by each passing package. However, when the prime becomes too great, the sensor detects the condition and deactivates the primary diverter 35 so as to permit the packages to pass to the end of the single file conveyor onto the conveyor 31 for manual handling.

As shown in FIGS. 1 and 2, overlying the two dead plates in each transfer location is an endless chain system 73 carrying spaced paddles 74 which are driven by the cartoner and moving in timed relation to the product buckets 21 of the cartoner. As each layer of packages 20 arrives on the dead plate 65, a paddle 74 sweeps the packages off the dead plate into a product bucket forming a layer of packages in the product bucket.

Figure 4:
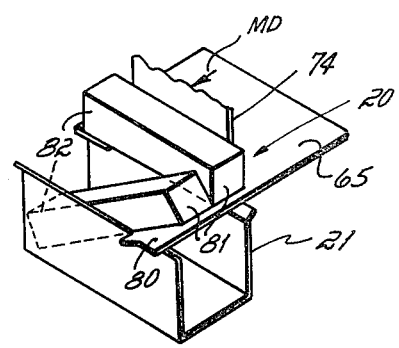

The dead plate 65 is specially designed to effect a controlled drop of the packages into the product buckets 21 and is best shown in FIGS. 3–8. The dead plate has a finger 80 which overlies one end of each product bucket and is aligned with one end 81 of each package. The finger projects beyond the remainder of the dead plate a distance which is approximately equal to the width of two packages. The other end 82 of each package will, when the package is thrust off the dead plate, drop into the product bucket 21 ahead of the package end 81 which remains supported on the finger 80. This operation is shown in FIGS. 3–8. In FIG. 3, a paddle 74 moving in the machine direction indicated at MD is in engagement with the layer of two packages. In FIG. 4, the paddle 74 has moved the first package along the dead plate a sufficient distance to drop its free end 82 into the product bucket. The remaining end 81 of the package is still supported on the finger 80 and is confined between the adjacent package and the vertical wall of the product bucket where it is controlled against twisting or skewing during its drop into the product bucket.

Figure 5:
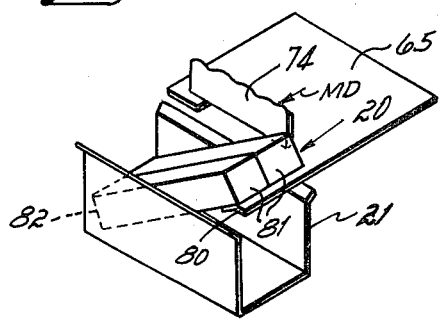

In FIG. 5, the second package has had its free end 82 dropped into the product bucket. In this attitude, both packages are controlled by their engagement with one another as well as engagement with the side walls of the product bucket.

Figure 6:
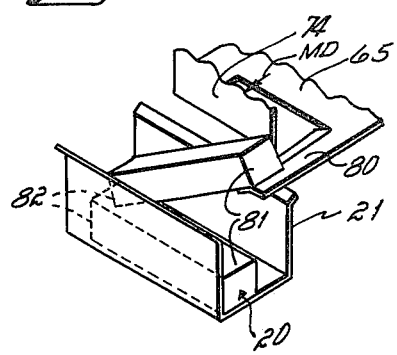

In FIG. 6, the first package has now had its end 81 pushed off the finger 80. It remains under control by its engagement with the side wall of the product bucket as well as its engagement with the end 82 of the remaining package.

Figure 7:
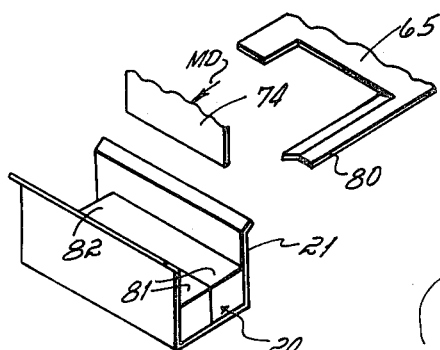

As shown in FIG. 7, the remaining package has had its end 81 pushed off the finger 80 so that both packages have been dropped into the product buckets to form the bottom layer.

Figure 8:
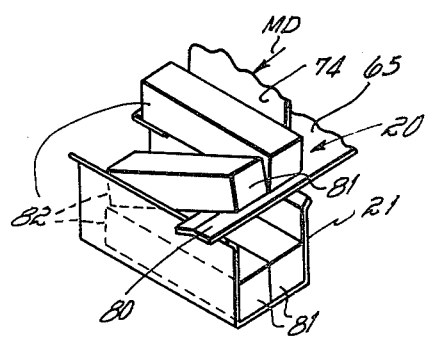

FIG. 8 illustrates a comparable operation wherein a second layer of packages is dropped into the product bucket to form a complete group of packages ready for insertion into a carton by the conventional cartoner mechanism.

The apparatus is adapted to form a layer of three packages, or more if required. To form layers of three packages, the pusher arms 66 which thrust packages onto the dead plate must be extended so as to be capable of engagement with three packages rather than two as illustrated. Further, the position of the sensor which determines the presence of a sufficient prime in the accumulator sections is positioned to detect the presence of at least three packages in the prime.

The illustrated apparatus shows the packaging of two layers of packages to each product bucket and, hence, each carton. The machine is easily adapted to the packaging of a single layer for each carton. In that instance, each accumulator station will be programmed to drop a layer of packages into every sixth bucket as contrasted to the dropping of a layer into every third bucket as shown in the illustrated form of the invention.

In the illustrated form of the invention, a chain and clutch engaged pusher mechanism is shown for the purpose of thrusting the packages longitudinally from the accumulator sections onto the dead plate. It should be understood that a piston and cylinder operated pusher with a suitable cam track to permit the pusher bar to rise on the return stroke could be substituted. The latter would not be as susceptible to a timing problem as the clutch operated chain of the illustrated form of the invention. More particularly, the finite time for response of the clutch engaging and disengaging to operate the pusher causes the pusher lugs to stop at differing positions depending upon the speed of the cartoner. To the extent that the pusher lugs function as guides to keep the ends of the packages from contact with the chains 67 during transfer off the dead plate 65, (as might happen at the downstream or left dead plate) a plurality of adjacent lugs shown in phantom is required at each pusher position to assure the presence of guiding lugs when the clutch is disengaged.

The control system for the invention is diagrammatically illustrated in FIG. 12. The cartoner drive shaft 85 is connected through a gear box 86 to the overhead sweep conveyor 73 which sweeps the packages off the dead plate into buckets 21. The transfer pushers 66 are connected through clutches 88 to the gear box 86 and, hence, to the cartoner drive shaft 85. Each clutch has an electric eye 89 associated with the drive to the clutch to disengage the clutch after one revolution. The clutch also has in its circuit the electric eye 63 to determine whether there is a sufficient prime and a cam-operated contact 90 driven by the cartoner, which determines that the position of the sweep paddle 74 is proper for thrusting the packages from the accumulator sections onto the dead plate 65 ahead of the paddle 74.

A separate motor 92 drives the single file conveyor 23, the diverter conveyors 33 and 34, the accumulator conveyors 58. When the diverters 35 and 49 are clutch and crank driven they derive their power from the motor 92. Thus if the cartoner is stopped, the diverters can function to allow product to flow from the wrapping machine through the ejector to conveyor 31.

It might be observed that the apparatus as illustrated employs a primary diverter and a secondary diverter both of which shift packages transversely. The two diverter system is preferred since the primary diverter increases the longitudinal spacing between incoming packages and permits the machine to be run at higher speeds while handling the packages more slowly as they are shifted from the diverter conveyors into the accumulator sections. The upstream or primary diverter is capable of moving packages left and right quite quickly since it moves them against the guide plates 38 and 39 (FIG. 9). The secondary diverter, however, has no such guide against which the packages are thrust and to operate at high speeds would have to operate so rapidly as to possibly kick the packages too far onto the accumulator conveyors 58 and thus lose control of the packages. Furthermore, the primary diverter admits of the possibility of disengaging the diverter when a jam occurs downstream so as to permit the flow of packages from the wrapping machine to be continued but dropped onto the conveyor 31 for manual handling. Thus, a single diverter could suffice but with the attendant loss of advantages of the two diverter system.

In the operation of the invention, packages 20 are fed single file onto conveyors 23 from three wrapping machines. At each transfer station, the single file packages are shifted alternately by the diverter 32 onto diverter conveyors 33 and 34 by the pusher plate 35. The pusher plate 35 is operated as required by the inflow of packages as detected by the photoelectric device 40. The diverter 32 doubles longitudinal spacing between the packages on the diverter conveyors 33, 34.

As the packages arrive at the downstream ends of the conveyors 33, 34, they are detected by sensors 55 and thrust transversely into accumulator sections 45 and 46 by the secondary diverter 48 whose pusher 49 thrusts the packages alternately left and right onto conveyors 58 formed by three conveyor belts 59 in each accumulator section. The conveyors 58 convey the packages over to stop plate 61 thereby building up a prime of packages in side-by-side relation in each accumulator section.

When a sufficient prime is detected by the sensors 63, the transfer pushers 66 are operated to thrust the predetermined number of packages (two illustrated) from a respective accumulator section onto a dead plate 65 in one or the other transfer locations 26, 27. The group of packages on the dead plate 65 is immediately thrust by the paddle 74 off the dead plate and into a respective product bucket as illustrated in FIGS. 3–8. The operation of the three transfer apparatuses is timed to fill all product buckets with two layers in the following manner:

For the purpose of illustration, the upstream transfer apparatus 24 is designated as A, the intermediate transfer apparatus as B and the downstream apparatus as C. Each transfer apparatus will deposit packages from the right dead plate 65 and then the left dead plate 65, those packages from transfer apparatus A being designated, in the product buckets, as $A_R$, $A_L$, respectively.

Transfer apparatus A first deposits from the right transfer apparatus a group of two packages $A_R$ into the bottom of every third product bucket. The transfer apparatus will thereafter deposit a group of two packages to form the second layer $A_L$ into the same product bucket on top of the first layer $A_R$. Similarly, the B transfer apparatus will deposit packages from the right and left dead plates into the product buckets to form bottom and top layers $B_R$ and $B_L$, respectively.

In like manner, the transfer apparatus C will fill the remaining product bucket with lower and upper layers $C_R$ and $C_L$, respectively.

In practice, the cartoner is driven faster than the supply of product to be sure that there is no over supply of prime. Therefore, the buckets will be filled only as the prime permits, leaving occasional empty buckets.

In the illustrated form of the invention, each dead plate deposits packages in every third product bucket. In the event that only single layers are to be cartoned, the packages would be deposited from each dead plate into every sixth product bucket. Similar combinations of transfers can be made with different numbers of transfer apparatuses as long as the cartoning apparatus and transfer apparatuses are timed together to assure deposit of the required number of packages in order to fill the proper product buckets.

Having described my invention, I claim:

1. Apparatus for transferring elongated packages into product buckets on a conveyor comprising,
    means for feeding packages toward said product bucket conveyor in a direction perpendicular to said conveyor,
    two accumulator conveyors running parallel to said product bucket conveyor and in opposite directions, said accumulator conveyors having their upstream ends adjacent one another and adjacent said package feeding means,
    a diverter for pushing packages transversely to the length of the packages from said feeding means alternately onto respective accumulator conveyors,
    means for pushing packages longitudinally to the length of the packages from said accumulator conveyors onto a dead plate overlying said product bucket conveyor,
    and means for sweeping said packages transversely to the length of the packages off said dead plate into product buckets.

2. Apparatus for transferring elongated packages into product buckets on a conveyor comprising,
    means for feeding packages toward said product bucket conveyor in a direction perpendicular to said conveyor,
    two accumulator conveyors running parallel to said product bucket conveyor and in opposite directions, said accumulator conveyors having their upstream ends adjacent one another and adjacent said package feeding means,
    a diverter for pushing packages from said feeding means alternately onto respective accumulator conveyors,
    means for pushing packages from said accumulator conveyors onto a dead plate overlying said product bucket conveyor, and
    means for sweeping said packages off said dead plate into product buckets,
    said feeding means comprising:
        a single file conveyor,
        two diverter conveyors, one on each side of said single file conveyor, a primary diverter for pushing packages from said single file conveyor alternately onto said diverter conveyors,
        said diverter conveyors feeding packages into said first mentioned diverter.

3. Apparatus as in claim 2 further comprising,
    an eject conveyor running under the downstream end of said single file conveyor,
    means for disabling said primary diverter to effect discharge of packages from said single file conveyor directly onto said eject conveyor.

4. Apparatus as in claim 3 further comprising,
    a sensor associated with each said accumulator conveyor to determine the quantity of packages on said accumulator conveyor, said sensor being operable to operate said disabling means when said quantity exceeds a predetermined amount.

5. Apparatus as in claim 2 further comprising, a detector of packages on said single file conveyor, said detector being connected to said primary diverter to operate said primary diverter upon the arrival of each package past said detector.

6. Apparatus as in claim 1 in which said sweeping means comprises, at least one endless chain driven by a cartoner by which said product bucket conveyor is driven, said endless chain carrying at least one paddle and having a lower reach overlying said dead plate in a position to carry said paddle past said dead plate to sweep packages into said product buckets, and means timing the pushing of packages from said accumulator conveyors onto said dead plate just ahead of the sweep of said paddle past said dead plate.

7. Apparatus as in claim 6 in which said timing means comprises, a sensor associated with each accumulator conveyor to determine that there are sufficient packages in position on said accumulator conveyor to be deposited in said product bucket, a cam-operated timing contact to determine the position of said paddle, said sensor and contact cooperating to initiate the operation of said pushing means.

8. Apparatus for transferring elongated packages into product buckets comprising:

a single file conveyor for said packages, two diverter conveyors at the downstream end of said single file conveyor, a primary diverter located at the junction of said single file and diverter conveyors for moving packages alternately onto said diverter conveyors, an accumulator at the downstream end of each of said diverter conveyors and including a transverse conveyor running perpendicular to each diverter conveyor, a secondary diverter for pushing packages from said diverter conveyors onto said transverse conveyors, a dead plate adjacent the downstream end of each transverse conveyor and overlying said product buckets, means for pushing packages longitudinally from said transverse conveyor onto said dead plate, and means for sweeping said packages transversely off said dead plate and into said product buckets.

9. Apparatus as in claim 8 in which said dead plate is configured to drop packages into said product buckets one end at a time.

10. Apparatus as in claim 8 in which three transfer apparatuses feed packages into said product buckets, each said apparatus selectively feeding one of the following:

two layers of packages into every third product bucket and a single layer into every sixth product bucket.

11. In apparatus for transferring a plurality of elongated packages side-by-side into product buckets, a dead plate overlying said product buckets, said dead plate having a horizontally extending finger at one side thereof, said dead plate being free of obstruction opposite said finger so that the ends of elongated articles, having their opposite ends resting on said finger, are free to drop into the product buckets below, means for thrusting elongated packages onto said dead plate with their longitudinal axes perpendicular to said finger, means for sweeping said packages transversely off said dead plate in the direction of said finger, whereby the free ends of said packages are dropped sequentially into a product bucket wherein each article is temporarily supported, at its respective ends, by said finger and said product bucket respectively, and thereafter the ends which had been supported by said finger are sequentially dropped into said product bucket.

12. A dead plate as in claim 11 in which the length that said finger projects beyond the remainder of said dead plate is approximately equal to the total of the widths of the packages being swept off the dead plate.

* * * * *